UNITED STATES PATENT OFFICE.

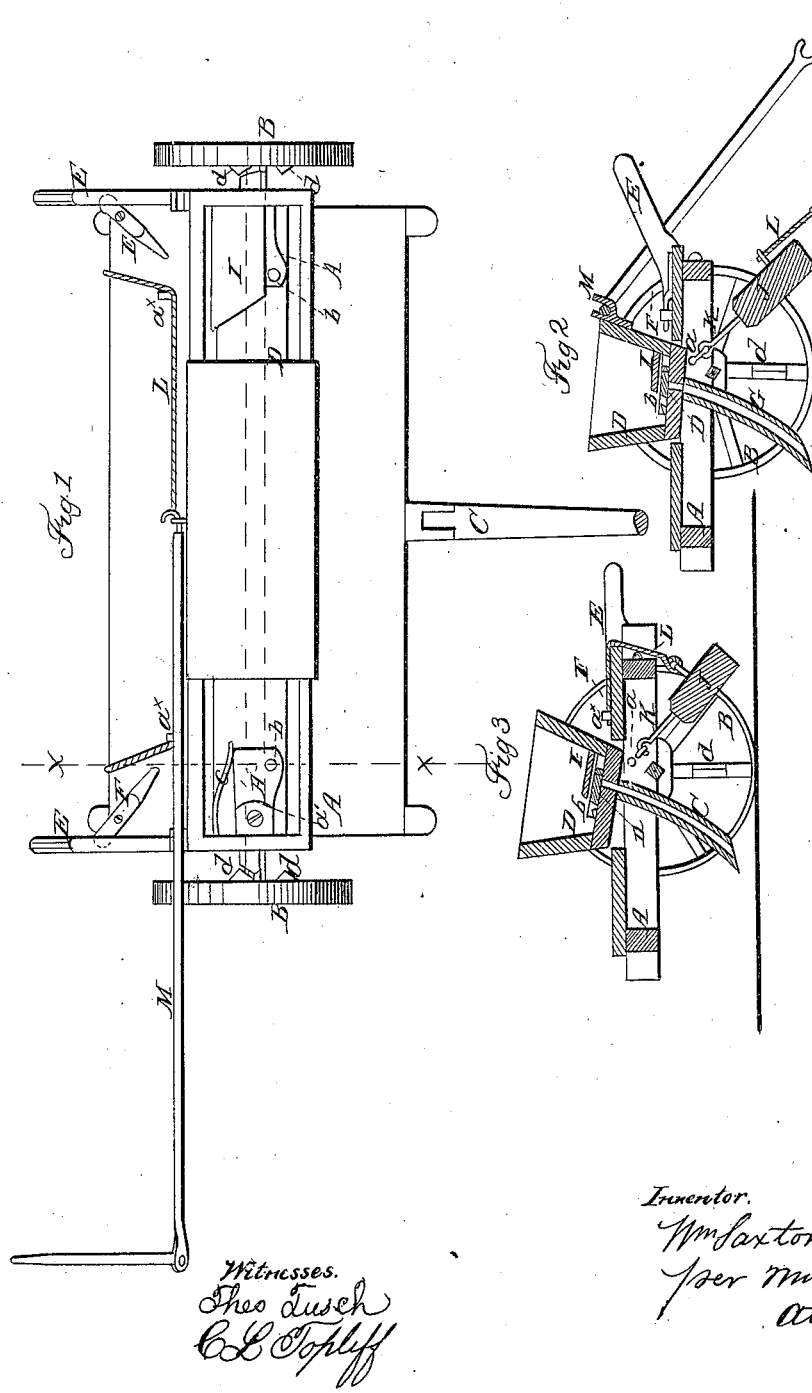

WILLIAM SAXTON, OF VENICE, MICHIGAN.

IMPROVEMENT IN SEEDING-MACHINES.

Specification forming part of Letters Patent No. 46,271, dated February 7, 1865.

*To all whom it may concern:*

Be it known that I, WILLIAM SAXTON, of Venice, in the county Shiawassee and State of Michigan, have invented a new and Improved Seeding-Machine; and I do hereby declare that the following is a full, clear, and exact description thereof, which will enable others skilled in the art to make and use the same, reference being had to the accompanying drawings, forming part of this specification, in which—

Figure 1 is a plan or top view of my invention. Figs. 2 and 3 are transverse vertical sections of the same, taken in the line $xx$, Fig. 1.

Similar letters of reference indicate like parts.

This invention relates to a new and improved seeding-machine of that class which drops the seed in hills; and it consists in the novel and improved seed-dropping mechanism, and in a novel arrangement of the seed box or hopper and coverers, whereby several advantages are obtained which will be hereinafter fully set forth.

A represents a rectangular framing, which is mounted on two wheels, B B, and has a draft-pole, C, attached to it in the usual manner.

D represents the seed box or hopper, which extends the whole width of the framing A, and has it front and rear sides inclined, as shown in Figs. 2 and 3. This seed-box has an arm, E, extending from it at each end and projecting back from the seed-box. These arms E are secured by pivots $a$ to the sides of the framing A. By depressing the outer ends of the arms E the seed-box D will be tilted or inclined, its front end being elevated, as shown in Fig. 3, and by raising the outer ends of said arms the seed-box will have a horizontal position, as shown in Fig. 2. The seed-box may be retained in either of these two positions by means of buttons F F on the rear part of the framing, said buttons being turned so as to project either over or under the arms, the buttons being over the arms when the seed-box is tilted upward and underneath them when in a horizontal position.

To the under side of the seed-box, at each end of the same, there is attached a seed-conveying tube, G, and the lower ends of these tubes form the furrow openers or shares. Within the seed-box, and directly over each tube G, there is a plate, H, which works on a pivot, $a'$. These plates project through the ends of the seed-box, as shown clearly in Fig. 1, and each is perforated with a hole, $b$, and has a spring, $c$, bearing against it, the springs having a tendency to keep the holes $b$ out of line with the upper ends of the tubes G. When the plates H are shoved back so that the holes $b$ will come in line with the upper ends of the tubes G, said holes will be underneath strikes or cut-offs I in the seed-box. The plates H are shoved back to bring their holes $b$ in line with the tubes G by means of projections $d$, attached to the spokes of the wheels B B. Two or more of these projections may be used, according to the distance apart it is designed to drop the seed. The holes $b$ become filled with seed when they are out from underneath the strikes or cut-offs I, and the seed is dropped when said holes are brought in line with the tubes G, the spring $c$ throwing the plates H forward each time a projection passes the outer ends of the plates.

The seed-dropping mechanism is rendered inoperative by tilting up the seed-box D, which brings the outer ends of the plates H out of the path of the movement of the projections $d$, and the lower ends of the tubes G will be out of the earth. Thus by this simple arrangement the seed-dropping mechanism may be rendered operative or inoperative.

J J are seed-coverers, which are simply blocks connected by links K to the under side of the seed-box. These coverers are in line with the seed-tubes G, and they have a cord or chain, L, attached to them, which, when the machine is in operation, drags upon the ground and serves to level the same.

When the machine is being drawn from place to place and the seed-dropping mechanism rendered inoperative and the tubes G out of the earth the coverers J are also elevated by placing the cord or chain L over pins $a^x a^x$ at the rear of the framing A, as shown in Figs. 1 and 3.

A reversible marker, M, is attached to the machine and arranged in the usual way.

Having thus described my invention, I claim as new and desire to secure by Letters Patent—

1. The pivoted seed-distributing plates H, arranged within the seed-box D, in combination with the projections $d$ on the wheels B B, and the springs $c$ on the adjustable seed-box D, all arranged substantially as and for the purpose herein set forth.

2. The coverers J J, attached to the seed-box by links K K, in connection with the cord or chain L, substantially as and for the purpose herein described.

WILLIAM SAXTON.

Witnesses:
L. WALKER,
GEO. M. WALKER.